United States Patent
Omori et al.

(10) Patent No.: US 11,451,805 B2
(45) Date of Patent: Sep. 20, 2022

(54) BUFFER APPARATUS

(71) Applicant: NIPPON TELEGRAPH AND TELEPHONE CORPORATION, Tokyo (JP)

(72) Inventors: Yuya Omori, Musashino (JP); Takayuki Onishi, Musashino (JP); Hiroe Iwasaki, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/973,741

(22) PCT Filed: Jun. 4, 2019

(86) PCT No.: PCT/JP2019/022087
§ 371 (c)(1),
(2) Date: Dec. 9, 2020

(87) PCT Pub. No.: WO2019/239951
PCT Pub. Date: Dec. 19, 2019

(65) Prior Publication Data
US 2021/0258591 A1  Aug. 19, 2021

(30) Foreign Application Priority Data
Jun. 11, 2018  (JP) .............................. JP2018-111412

(51) Int. Cl.
*G11B 20/00* (2006.01)
*H04N 13/00* (2018.01)
(Continued)

(52) U.S. Cl.
CPC ..... *H04N 19/423* (2014.11); *G11B 20/00007* (2013.01); *G11B 20/10527* (2013.01); *H04N 19/433* (2014.11); *G11B 2020/10675* (2013.01)

(58) Field of Classification Search
USPC ................ 386/239, 242, 248, 278, 280, 284
See application file for complete search history.

(56) References Cited

U.S. PATENT DOCUMENTS

| | | | |
|---|---|---|---|
| 2007/0098075 A1* | 5/2007 | Ohgose ................ | H04N 19/61 375/240.16 |
| 2007/0133683 A1* | 6/2007 | Ohgose ................ | H04N 19/57 375/240.16 |

(Continued)

FOREIGN PATENT DOCUMENTS

| | | |
|---|---|---|
| JP | 2006340139 A | 12/2006 |
| WO | WO-2011048764 A1 | 4/2011 |

OTHER PUBLICATIONS

Takayuki Onishi et al., Single-chip 4K 60fps 4:2:2 HEVC Video Encoder LSI with 8K Scalability, 2015 Symposium on VLSI Circuits Digest of Technical Papers, Jun. 2015, C54-C55.

*Primary Examiner* — Daquan Zhao

(57) ABSTRACT

A buffer device stores, in relation to a first area and a second area, which are partial areas respectively located on an identical line of an encoding target frame, and a third area, which is a partial area on the line below the identical line, reference image data for each search range of a reference frame that is referred to during motion search processing executed in order of the first area, the second area, and the third area, the buffer device including a memory for storing the reference image data, and a buffer control unit which, when the motion search processing is executed on the second area, executes control so that among the reference image data included in a first search range that is referred to during the motion search processing of the first area, the (Continued)

reference image data included in a third search range that is referred to during the motion search processing of the third area are left in the memory without being deleted.

5 Claims, 13 Drawing Sheets

(51) Int. Cl.
*H04N 19/00* (2014.01)
*H04N 19/423* (2014.01)
*H04N 19/433* (2014.01)
*G11B 20/10* (2006.01)
*H04N 9/00* (2006.01)
*H04N 7/00* (2011.01)
*H04N 5/00* (2011.01)

(56) References Cited

U.S. PATENT DOCUMENTS

| | | | |
|---|---|---|---|
| 2009/0290642 A1* | 11/2009 | Ohgose | H04N 19/46 375/240.16 |
| 2011/0150091 A1* | 6/2011 | Young | H04N 19/56 375/240.16 |
| 2011/0228851 A1* | 9/2011 | Nusboim | H04N 19/57 375/240.16 |
| 2011/0235716 A1 | 9/2011 | Tanaka et al. | |
| 2017/0238011 A1* | 8/2017 | Pettersson | H04N 19/105 375/240.12 |
| 2018/0352247 A1* | 12/2018 | Park | H04N 19/513 |

* cited by examiner

BUFFER APPARATUS

CROSS-REFERENCE TO RELATED APPLICATIONS

This application is a 371 U.S. National Phase of International Application No. PCT/JP2019/022087, filed on Jun. 4, 2019, which claims priority to Japanese Application No. 2018-111412 filed on Jun. 11, 2018. The entire disclosures of the above applications are incorporated herein by reference.

TECHNICAL FIELD

The present invention relates to a buffer device.

BACKGROUND ART

Video coding standards such as MPEG (Moving Picture Experts Group)-2, MPEG-4, and MPEG-4/AVC (Advanced Video Coding) are available. Further, HEVC (High Efficiency Video Coding) is a video coding standard that is expected to become more widespread in the future. The coding efficiency of HEVC is approximately double the coding efficiency of MPEG-4/AVC. With this improved coding efficiency, HEVC can encode moving images with a high spatial resolution such as 4K (3840 pixels×2160 lines) or 8K (7680 pixels×4320 lines).

In a video coding standard, the coding efficiency is greatly improved by performing encoding processing hierarchically so that input image data are encoded using encoding blocks of different sizes. In this hierarchical encoding processing, an encoding device searches a search range included in a reference image for coordinates at which a cumulative value or the like of a difference between reference image data, which have already been encoded, and the input image data reaches a minimum within.

In hierarchical encoding processing, a search module provided in the encoding device uses the same reference image data many times, and therefore an extremely large amount of reference image data is required. Since the size of the reference image data is extremely large, it is difficult to store all of the required reference image data in an internal memory of an LSI (Large Scale Integration). Accordingly, the reference image data may be stored in an external memory. However, the data transfer rate of the external memory is limited, and therefore a reference image buffer provided in the LSI stores the reference image data temporarily and outputs the temporarily stored reference image data to the search module.

In order to reduce the data transfer rate required of the external memory, the reference image buffer may temporarily store only an amount of reference image data corresponding to the width of a frame of the reference image (see NPL 1). Hereafter, an encoding block to be encoded will be referred to as an "encoding target block". In a video coding standard such as HEVC, encoding target blocks are selected in raster scanning order. An inter prediction search range of the reference image has a rectangular shape. Moreover, in the frame of the reference image, a positional relationship between the position of a same-position block, which is a block in the same position as the position of the encoding target block on the encoding target frame, and the center of the search range is often fixed in the frame of the reference image.

As long as the reference image buffer temporarily stores an amount of reference image data corresponding to (image width×search range height), there is no need to update the reference image data stored in the reference image buffer even after the next encoding block is selected on the same line of the frame. While the encoding processing is being executed on the plurality of encoding blocks on the same line, the reference image buffer transfers an amount of reference image data corresponding to (image width×block height) to the search module.

Thus, the reference image buffer can reduce the data transfer rate required of the external memory to a rate of (block width×block height/processing time for 1 block). However, the size of the reference image buffer substantially corresponds to the size of (image width×search range height). Therefore, when the encoding processing is executed on a moving image with a high spatial frequency such as 4K or 8K, the size of the reference image buffer increases massively, leading to increases in the scale, size, and power of the LSI.

The reference image buffer may store only the reference image data in the search range of the encoding target block. When the encoding processing on the encoding target block is completed and the next encoding target block is selected, the range of the overlap between the search ranges is wide. Accordingly, the only reference image data that need to be transferred after the next encoding target block is selected are reference image data of a size corresponding to the width of one block on the right side outside the search range. In this case, the size of the reference image buffer substantially corresponds to the size of (search range width×search range height). The data transfer rate of the external memory is a rate of (block width×search range height/processing time for 1 block), and as a result, the data of a moving image with a high spatial frequency such as 4K or 8K can be transferred.

CITATION LIST

Non Patent Literature

[NPL 1] Takayuki Onishi, Takashi Sano, Yukikuni Nishida, KazuyaYokohari, Jai Su, Ken Nakamura, Koyo Nitta, Kimiko Kawashima, Jun Okamoto, Naoki Ono, Ritsu Kusaba, AtsushiSagata, Hiroe Iwasaki, Mitsuo Ikeda, and Atsushi Shimizu, "Single-chip 4K 60 fps 4:2:2 HEVC Video Encoder LSI with 8K Scalability," Dig. Symp. VLSI Circuits, C54-055, June 2015.

SUMMARY OF THE INVENTION

Technical Problem

However, when the encoding processing is completed on an encoding target block corresponding to the block at the right edge of the original image so that the encoding target block is switched to the block at the left edge of the line directly below, in the raster scanning order, on the original image, the inter prediction search range used to encode the encoding target block corresponding to the block at the right edge of the original image does not overlap the inter prediction search range used to encode the encoding target block corresponding to the block at the left edge of the original image.

When the encoding target block is switched to the block at the left edge of the line directly below, in the raster scanning order, on the original image in a case where the reference image buffer stores only the reference image data of the search range, the buffer device must transfer all of the reference image data of the search range from the external memory to the reference image buffer within the processing time for 1 block.

The size of the reference image data of the search range affects the coding efficiency. Therefore, when the encoding target block is switched to the block at the left edge of the line directly below, in the raster scanning order, on the original image, the transfer rate may increase, and as a result, the reference image data may not be transferred in time. The search module in the LSI performs motion search processing on the reference image data that have been stored in the buffer from the external memory, but when there is not enough time to transfer the reference image data within the processing time for 1 block, the search module cannot perform the motion search processing on the partial area of the reference image that could not be transferred. Hence, in the encoding target blocks at the left edge of the screen, the motion search precision and the objective image quality may deteriorate greatly. Moreover, in the reference image transfer method described above, using the fact that in the left and right blocks, the overlap range of the search range is wide, only reference image data of a size corresponding to the width of one block on the right side outside the search range are newly transferred. Therefore, when the reference image data cannot be fully transferred in an encoding target block at the left edge of the screen, omissions remain in the reference image data stored in the buffer outside the area corresponding to the block width size on the right side likewise in the next encoding target block. Thus, the transfer error occurring in the reference image data at the left edge of the screen affects not only the left edge blocks but also a large number of adjacent encoding target blocks, leading to deterioration of the objective image quality and an increase in the amount of encoding over the entire screen. Hence, one of the problems of a conventional buffer device is that it is impossible to suppress the size of the buffer memory required to store the reference image data temporarily and the data transfer rate required of the external memory.

In consideration of the circumstances described above, an object of the present invention is to provide a buffer device with which the size of a buffer memory required to store reference image data temporarily and a data transfer rate required of an external memory can be suppressed.

Means for Solving the Problem

One aspect of the present invention is a buffer device which, in relation to a first area and a second area, which are partial areas respectively located on an identical line of an encoding target frame, and a third area, which is a partial area on the line below the identical line, stores reference image data for each search range of a reference frame that is referred to during motion search processing executed in order of the first area, the second area, and the third area, the buffer device including a memory for storing the reference image data, and a buffer control unit which, when the motion search processing is executed on the second area, executes control so that among the reference image data included in a first search range that is referred to during the motion search processing of the first area, the reference image data included in a third search range that is referred to during the motion search processing of the third area are left in the memory without being deleted.

One aspect of the present invention is the buffer device described above, wherein the buffer control unit executes control so that the reference image data included in the first search range and the third search range, which include a left edge of the reference frame, are left in the memory without being deleted.

One aspect of the present invention is a buffer device which, in relation to a first area and a second area, which are partial areas respectively located on an identical line of an encoding target frame, and a third area, which is a partial area on the line below the identical line, stores reference image data for each search range of a reference frame that is referred to during motion search processing executed in order of the first area, the second area, and the third area, the buffer device including a memory for storing the reference image data, and a buffer control unit which, when the motion search processing is executed on the third area, records the reference image data not included in a first search range that is referred to during the motion search processing of the first area, among the reference image data included in a third search range that is referred to during the motion search processing of the third area, in the memory.

One aspect of the present invention is the buffer device described above, wherein, when some pixels of the third search range protrude from the reference frame, the buffer control unit generates the reference image data of the protruding pixels on the basis of the reference image data of the non-protruding pixels, and records the generated reference image data together with the acquired reference image data in the memory.

One aspect of the present invention is the buffer device described above, wherein the buffer control unit associates labeling data representing a long period, among labeling data expressing whether or not a storage period in the memory is the long period, with the acquired reference image data, and executes control so that the reference image data with which the labeling data representing the long period are associated are left in the memory for a longer period than the reference image data with which the labeling data representing the long period are not associated.

Effects of the Invention

According to the present invention, the size of the buffer memory that is required to store the reference image data temporarily and the data transfer rate required of the external memory can be suppressed.

BRIEF DESCRIPTION OF DRAWINGS

FIG. 9 is a view showing an example of transitions undergone by reference image data of a search range required by an encoding target block at the left edge of an original image or the like.

FIG. 10 is a view showing an example of the transitions undergone by the reference image data of a search range required by an encoding target block positioned near the left edge of the original image or the like.

FIG. 11 is a view showing an example of the transitions undergone by the reference image data of a search range required by an encoding target block positioned near the right edge of the original image or the like.

FIG. 12 is a view showing an example of the transitions undergone by the reference image data of a search range required by an encoding target block at the right edge of the original image or the like.

DESCRIPTION OF EMBODIMENTS

An embodiment of the present invention will be described in detail with reference to the figures.

Hereafter, the "encoding block" is a macroblock according to the MPEG-2 and H.264/AVC standards. According to the HEVC standard, the "encoding block" is a coding unit (CU) or a prediction unit (PU).

Figure 1:
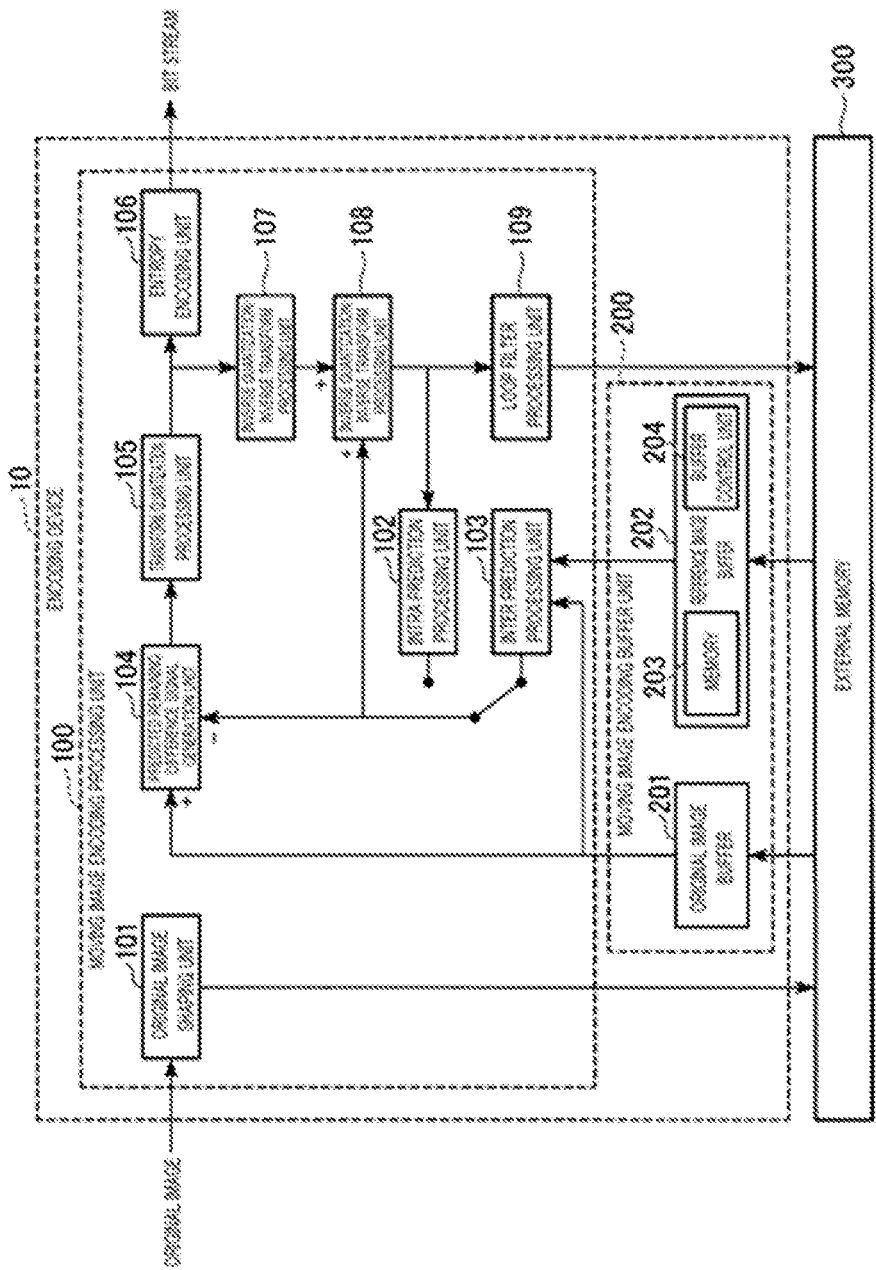
FIG. 1 is a view showing an example configuration of an encoding device.

FIG. 1 is a view showing an example configuration of an encoding device 10. The encoding device 10 includes a moving image encoding processing unit 100 and a moving image encoding buffer unit 200. The encoding device 10 is connected to an external memory 300. The encoding device 10 writes encoded reference image data to an external memory 300.

The encoding device 10 acquires a signal of an encoding subject moving image (a signal of an input image) as original image data. The encoding device 10 writes the original image data to the external memory 300. When the original image data are to be encoded, the encoding device 10 reads the original image data and the reference image data from the external memory 300.

The encoding device 10 temporarily records the original image data and reference image data read from the external memory 300 in the moving image encoding buffer unit 200. The moving image encoding processing unit 100 acquires the original image data and reference image data that are required for encoding processing from the moving image encoding buffer unit 200. The encoding device 10 encodes the original image data using the reference image data.

In a video coding standard such as H.264/AVC or HEVC, each frame of the moving image is encoded in encoding blocks. Hereafter, the moving image encoding processing unit 100 executes encoding processing in encoding blocks. The moving image encoding processing unit 100 encodes the acquired original image data on the basis of parameters. The moving image encoding processing unit 100 outputs an encoding result to the exterior of the encoding device 10 in the form of a bit stream. A display device on the exterior of the encoding device 10 may display a video based on the bit stream.

The moving image encoding processing unit 100 includes an original image shaping unit 101, an intra prediction processing unit 102, an inter prediction processing unit 103, a predicted remaining difference signal generation unit 104, a transform/quantization processing unit 105, an entropy encoding unit 106, an inverse quantization/inverse transform processing unit 107, a decoded signal generation unit 108, and a loop filter processing unit 109.

The moving image encoding buffer unit 200 includes an original image buffer 201 and a reference image buffer 202. The reference image buffer 202 includes a memory 203 and a buffer control unit 204. The buffer control unit 204 may be a separate mechanism that is independent of the reference image buffer 202.

Some or all of the respective function units are realized using hardware such as LSI or an ASIC (Application Specific Integrated Circuit), for example. Some or all of the respective function units may be realized by a processor such as a CPU (Central Processing Unit) by executing a program stored in a memory. The moving image encoding buffer unit 200 and the external memory 300 are nonvolatile recording media (non-temporary recording media) such as a flash memory or an HDD (Hard Disk Drive), for example. The buffer unit and the external memory may include a volatile recording medium such as a RAM (Random Access Memory).

The original image shaping unit 101 acquires the original image data in the raster scanning order of the frame. The original image shaping unit 101 shapes the acquired original image data into original image data in encoding block units. The original image shaping unit 101 writes the original image data in encoding block units to the external memory 300. The original image buffer 201 reads the original image data of an encoding target block, among the original image data in encoding block units, from the external memory 300. The original image buffer 201 temporarily stores the original image data of the encoding target block.

The reference image buffer 202 reads, from the external memory 300, the reference image data of a search range (an area of the reference frame) required by the inter prediction processing unit 103 to execute processing (motion search processing) to search for a motion vector of the encoding target block. The search range is determined in advance on the basis of the video coding standard. The memory 203 temporarily stores the read reference image data. The reference image buffer 202 modifies the timing at which the reference image data temporarily stored in the memory 203 are updated in accordance with the position of the encoding target block within the frame of the original image.

The inter prediction processing unit 103 reads the original image data from the original image buffer 201. The inter prediction processing unit 103 reads the reference image data from the memory 203 of the reference image buffer 202. The inter prediction processing unit 103 executes motion search processing between the original image data of the encoding target frame and the reference image data.

The predicted remaining difference signal generation unit 104 reads the original image signal from the original image buffer 201. The predicted remaining difference signal generation unit 104 calculates a difference between a prediction signal serving as the output of the intra prediction processing unit 102 or the inter prediction processing unit 103 and the original image in units of pixels and outputs the calculated difference to the transform/quantization processing unit 105 in the form of a predicted remaining difference signal.

The transform/quantization processing unit 105 quantizes a transform coefficient by executing an orthogonal transform such as a discrete cosine transform on the predicted remaining difference signal. The transform/quantization processing unit 105 outputs the quantized transform coefficient to the entropy encoding unit 106. The entropy encoding unit 106 performs entropy encoding on the quantized transform coefficient and outputs the result of the entropy encoding to the exterior of the encoding device 10 in the form of a bit stream.

The transform/quantization processing unit 105 outputs the quantized transform coefficient to the inverse quantization/inverse transform processing unit 107. The inverse quantization/inverse transform processing unit 107 executes inverse quantization and an inverse orthogonal transform on the quantized transform coefficient and outputs a predicted remaining difference decoding signal serving as the result of the inverse orthogonal transform. The decoded signal generation unit 108 generates a decoded signal for each encoding block by adding the predicted remaining difference decoding signal to the prediction signal output from the intra prediction processing unit 102 or the inter prediction processing unit 103.

The loop filter processing unit 109 executes filtering processing on the generated decoded signal to reduce encoding distortion. The loop filter processing unit 109 writes filtered image data, which are used as a reference image by the inter prediction processing unit 103, to the external memory 300.

Hereafter, the search range is a rectangular range centering on a point included in the reference image. Hereafter, a motion vector of the encoding target block, or in other words a vector expressing the position of a same-position block on the reference image and the center of the search range, will be referred to as an "area hopping vector". An area hopping vector Vhp is expressed as (Vhp_x, Vhp_y).

Figure 2:
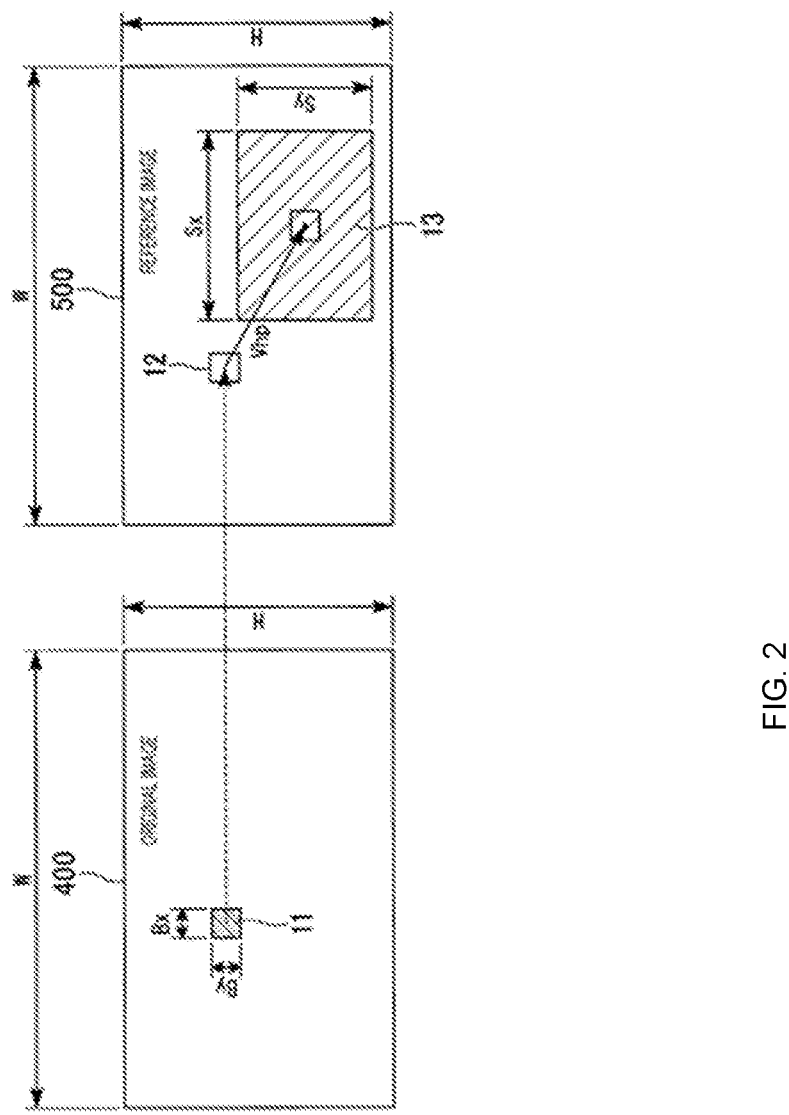
FIG. 2 is a view showing an example of a search range set using a rightward area hopping vector.

FIG. 2 is a view showing an example of a search range set using a rightward area hopping vector. The image size of an original image 400 (the encoding target frame) and the image size of a reference image 500 (the reference frame) are both (W×H). The size of an encoding target block 11 is (Bx×By). The size of a search range 13 is (Sx×Sy). Hereafter, the area hopping vector Vhp is fixed within the frame.

When the search range 13 has a rectangular shape and the area hopping vector Vhp is fixed, the encoding processing on the encoding target block 11 is completed. When the next encoding target block 11 is selected, the search range of a same-position block 12 in the frame of the reference image 500, the same-position block 12 being the block in the same position as the position of the encoding target block 11 on the original image 400, has a large overlapping range before and after the end of the encoding processing.

Figure 3:
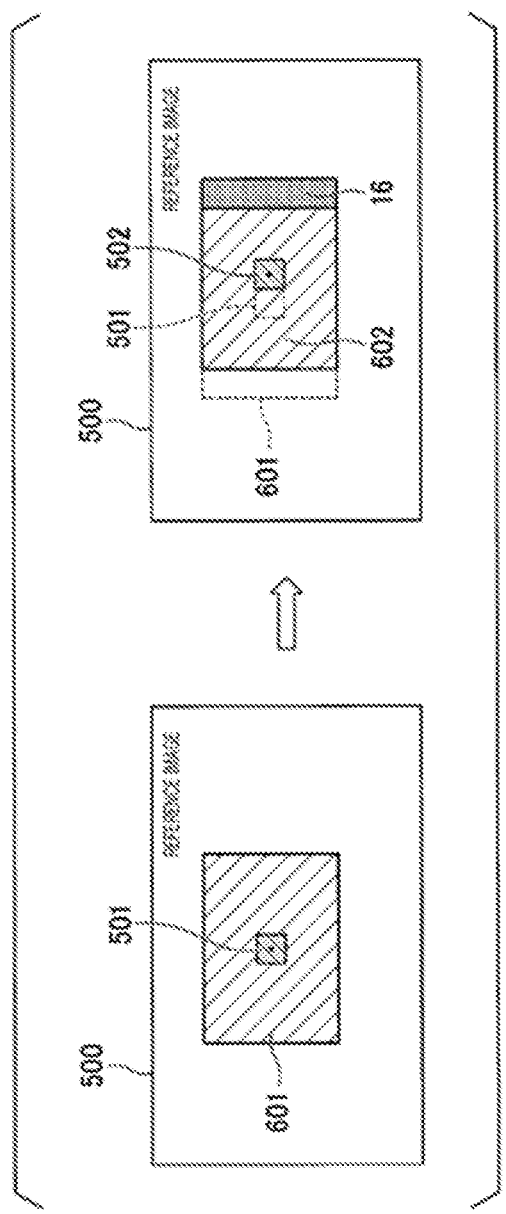
FIG. 3 is a view showing an example of variation in the position of the search range within a frame of a reference image.

FIG. 3 is a view showing an example of variation in the position of the search range in the frame of the reference image 500. For ease of description, in the examples shown in FIGS. 3 to 5, the area hopping vector is not shown, and the center of the search range matches the position of the same-position block of the encoding target block. Hereafter, a search range that needs to be newly stored in the reference image buffer 202 will be referred to as a "new required range".

In FIG. 3, when the same-position block of the encoding target block is modified from a block 501 to a block 502, the search range is modified from a search range 601 to a search range 602. Here, the surface area of the difference part between the search ranges is a surface area corresponding to the width of one block (a new required range 16) on the right side outside the search range 601. The inter prediction processing unit 103 reads the reference image data of the new required range 16 required for the search processing from the memory 203 of the reference image buffer 202. The size of the reference image data (new required data) of the new required range 16 is (Bx×Sy).

When encoding processing on the encoding target block 11 corresponding to a block at the right edge of the original image 400 is completed and the encoding target block 11 is switched to the block at the left edge of the line directly below, in the raster scanning order, on the original image, the search ranges 13 relating to the block at the right edge and the block at the left edge have the following relationship. The inter prediction search range 13 used to encode the encoding target block 11 corresponding to the block at the right edge of the original image does not overlap the inter prediction search range 13 used to encode the encoding target block 11 corresponding to the block at the left edge of the original image 400.

Figure 4:
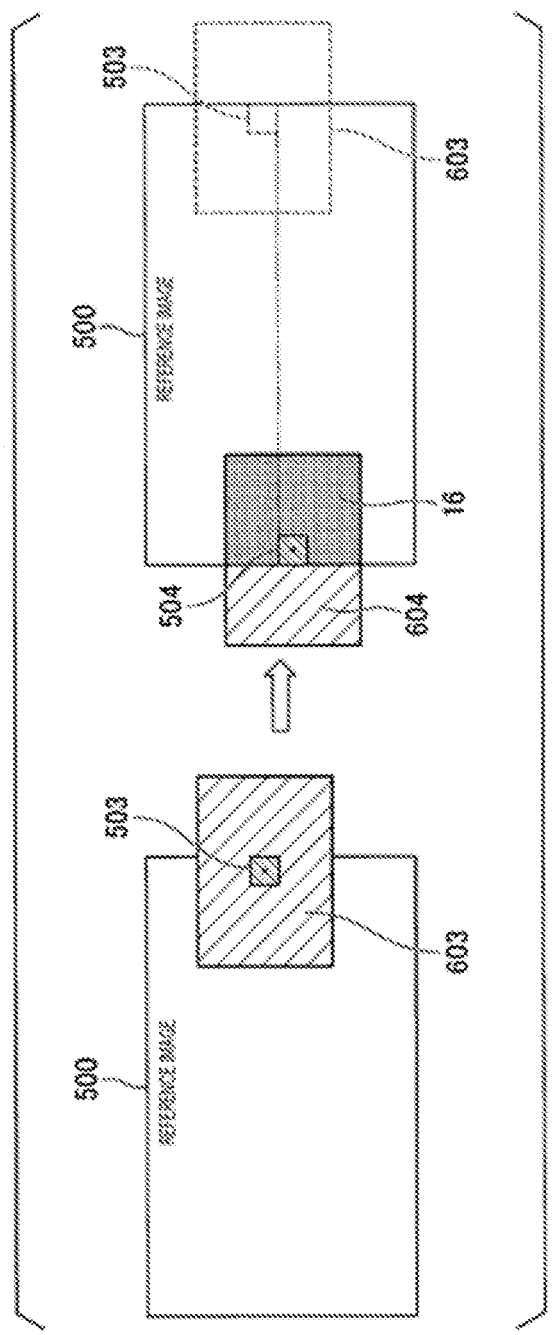
FIG. 4 is a view showing an example of variation in the position of the search range when an encoding processing line is modified to the line directly below.

FIG. 4 is a view showing an example of variation in the position of the search range 13 when the encoding processing line is modified to the line directly below. In FIG. 4, a block 503 serving as the same-position block is at the right edge of the reference image 500, and therefore a search range 603 protrudes from the reference image 500. In moving image encoding processing such as HEVC, however, it is permitted for the retrieved motion vector to point to the exterior of the reference image 500. In this case, the pixel values of the pixels at the edge of the reference image 500 are often set as the pixel values of the pixels outside the reference image 500. As a result, the reference image data stored in the reference image buffer 202 in relation to the block 503 are reference image data of a narrower range than the search range 603.

As shown in FIG. 4, when the position of a block 504 serving as the same-position block is modified from the right edge to the left edge of the reference image 500 so that the search range is modified from the search range 603 to a search range 604, no overlapping range exists between the search range 603 and the search range 604 unless the respective widths of the search range 603 and the search range 604 are at least half the width of the reference image 500. In a moving image with a high spatial resolution of 4K or 8K, the size of the search range is smaller than the size of the original image. Accordingly, the size of the reference image data of the search range (the new required range 16) that needs to be newly stored in the reference image buffer 202 corresponds to the size of the search range 604 itself. Note, however, that the pixels in the search range outside the reference image 500 are interpolated from the pixels at the edge of the reference image 500.

The reference image buffer 202 must store the reference image data within the search range of the motion vector of the next encoding target block before prediction processing is started on the next encoding target block. When reference image data of a size of (screen width×search range height) are temporarily stored in the reference image buffer 202, reference image data of a size corresponding to one encoding target block may be transferred within the processing time for 1 encoding target block, whereby the bandwidth can be suppressed, but the buffer size required by the reference image buffer 202 increases massively. When, on the other hand, only the reference image data of the search range required by the encoding target block are stored in the reference image buffer 202, the buffer size required by the reference image buffer 202 decreases. Further, when the processing line is updated, the amount of data to be transferred from the external memory 300 to the reference image buffer 202 may exceed the bandwidth. In other words, since the reference image data of the new required range 16 required by the block 504 at the left edge of the reference image 500 are reference image data not required by the block 503, none of these reference image data are stored in the reference image buffer 202, and as a result, the amount of transferred data increases.

Figure 5:
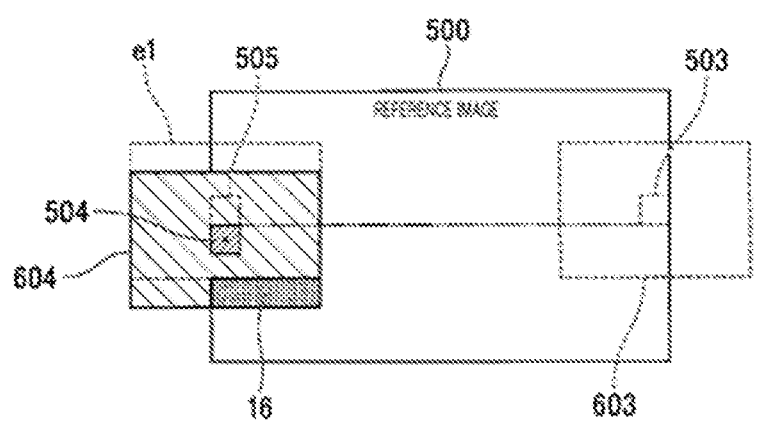
FIG. 5 is a view showing an example of overlap between search ranges when the encoding processing line is modified to the line directly below.

FIG. 5 is a view showing an example of overlap between the search ranges when the encoding processing line is modified to the line directly below. The reference image data of the search range 604 required by the block 504 at the left edge of the reference image 500 form a part of the reference image data of a search range el of a block 505 that was used when the encoding processing was executed on the encoding target block 11 on the line directly above. In other words, the search range el of the block 505 serving as the same-position block located (W/Bx) blocks before the block 504 partially overlaps the search range 604.

As shown in FIG. 5, the overlapping range between the search range 604 of the block 504 and the search range el of the block 505 positioned above the block 504 on the frame of the reference image 500 has a large a surface area. Here, the overlapping area between the search range of the block 504 and the search range of the block 505 may be stored in the reference image buffer 202 even after encoding of the block 504 is complete so that when the block 505 is to be encoded, only the new required range 16, which is the area in which the search range of the block 505 and the search range of the block 504 do not overlap, is stored additionally in the reference image buffer 202. In so doing, both the transfer amount of the reference image data to be newly stored in the reference image buffer 202 when encoding of the block 503 is complete and the block 504 is to be encoded and the size of the reference image data that remain stored in the reference image buffer 202 can be suppressed. The size of the reference image data of the search range (the new required range 16) newly required as the search range 604 of the block 504 corresponds to a reference image data size of (Sx×By). Note, however, that the pixels in the search range outside the reference image 500 are interpolated from the pixels at the edge of the reference image 500.

The buffer control unit 204 executes control for classifying, reading, writing, deleting, and otherwise processing the reference image data. The buffer control unit 204 sets a length of time that the reference image data of the block at the left edge of the reference image 500 are held in the reference image buffer 202 at the length of the processing time (a long period) required to encode (W/Bx blocks). In other words, the buffer control unit 204 holds the reference image data of the block 505 at the left edge of the reference image 500 in the memory 203 of the reference image buffer 202 until the encoding processing has been completed on the encoding target blocks on one line of the original image 400.

The buffer control unit 204 sets a time that the reference image data of the blocks in locations other than the left edge of the reference image 500 are held in the reference image buffer 202 at the processing time (a short period) required to process (Sx/Bx blocks). The buffer control unit 204 updates the reference image data held in the reference image buffer 202 for each encoding target block by deleting the reference image data that will not be referred to during the encoding processing of the encoding target block from the reference image buffer 202.

Thus, the buffer control unit 204 can suppress an increase in the amount of data transferred from the external memory 300 to the reference image buffer 202 at the time of a processing line update even when the size of the memory 203 is small.

When the reference image buffer 202 reads the reference image data from the external memory 300, the buffer control unit 204 classifies the reference image data into two types, namely data to be stored in the reference image buffer for the long period (referred to hereafter as "long term data") and data to be stored in the reference image buffer for the short period (referred to hereafter as "short term data"), in accordance with the length of time that the reference image data are to be held in the reference image buffer 202.

The buffer control unit 204 associates labeling data expressing whether or not the storage period in the memory 203 is the long period with the reference image data. The buffer control unit 204 records the classified reference image data in the memory 203 of the reference image buffer 202. The buffer control unit 204 records the classification result in the memory 203 as an additional bit of the reference image data, for example. Note that the buffer control unit 204 may record the classification result in a separate mechanism or buffer. For example, the buffer control unit 204 may associate labeling data with the reference image data and store the resulting data in an internal memory of the buffer control unit 204.

Next, an operation of the buffer control unit 204 will be described.

Figure 6:
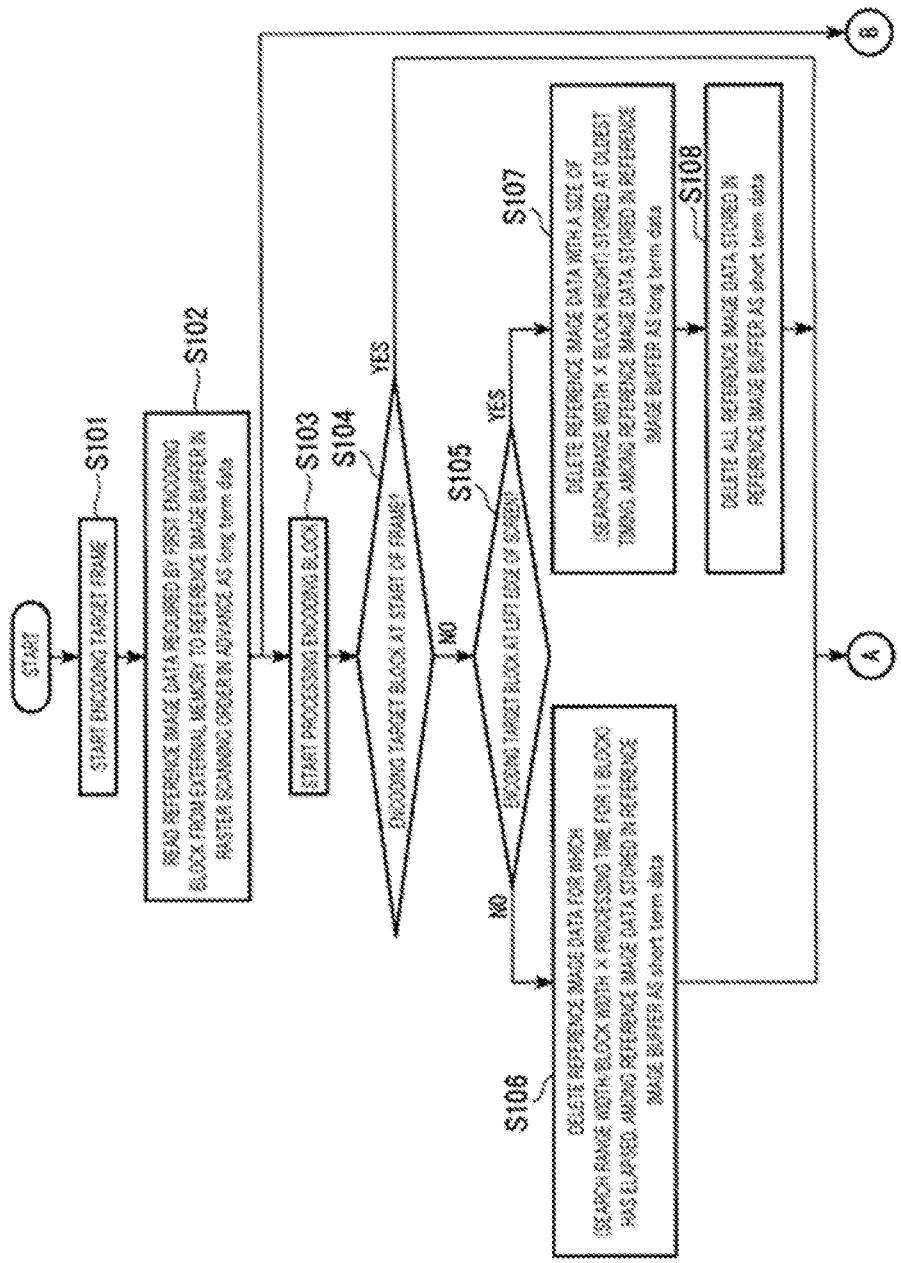
FIG. 6 is a flowchart showing (the first half of) an operation of the encoding device.
Figure 7:
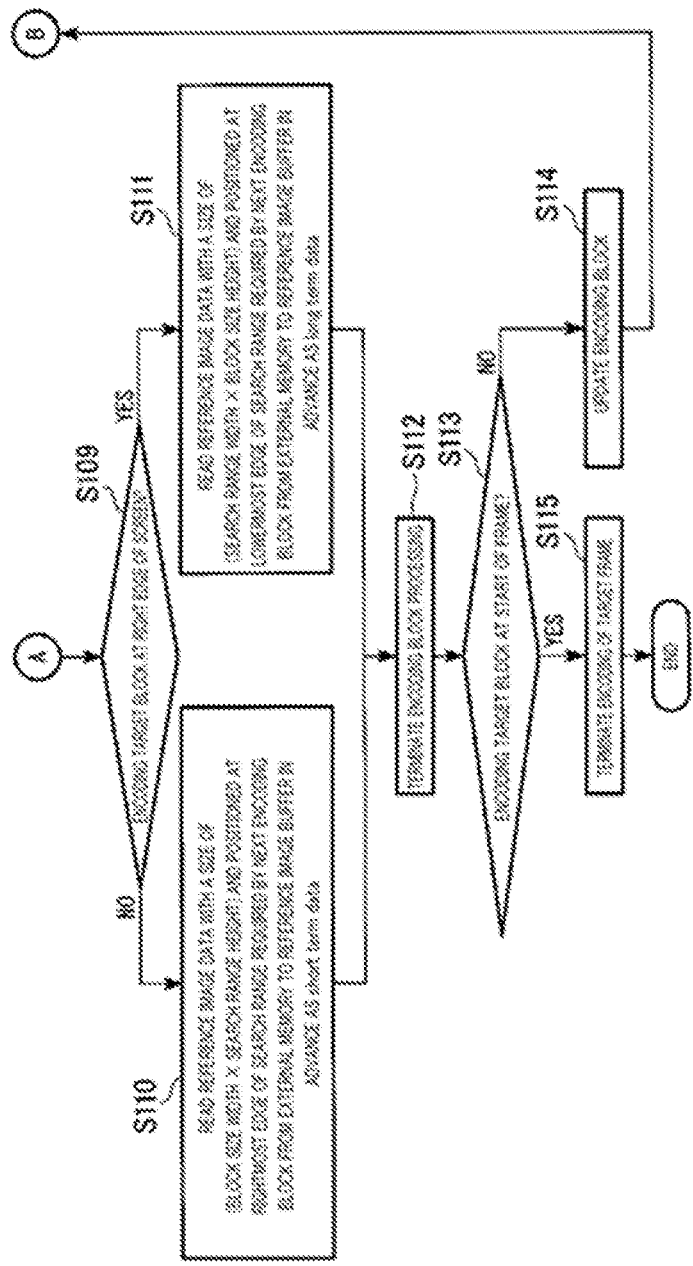
FIG. 7 is a flowchart showing (the second half of) an operation of the encoding device.

FIGS. 6 and 7 are flowcharts showing an operation of the encoding device 10. The buffer control unit 204 executes processing in frame units of the original image. The buffer control unit 204 starts the encoding processing on the encoding target frame (step S101).

The buffer control unit 204 executes initial transfer processing on the reference image data. More specifically, the buffer control unit 204 reads all of the reference image data of the search range required by the encoding block at the upper left edge of the first original image to be encoded (the encoding target frame) from the external memory 300. The buffer control unit 204 records the read reference image data in the memory 203 of the reference image buffer 202. The buffer control unit 204 classifies all of the reference image data read in the initial transfer processing as "long term data" (step S102).

Figure 8:
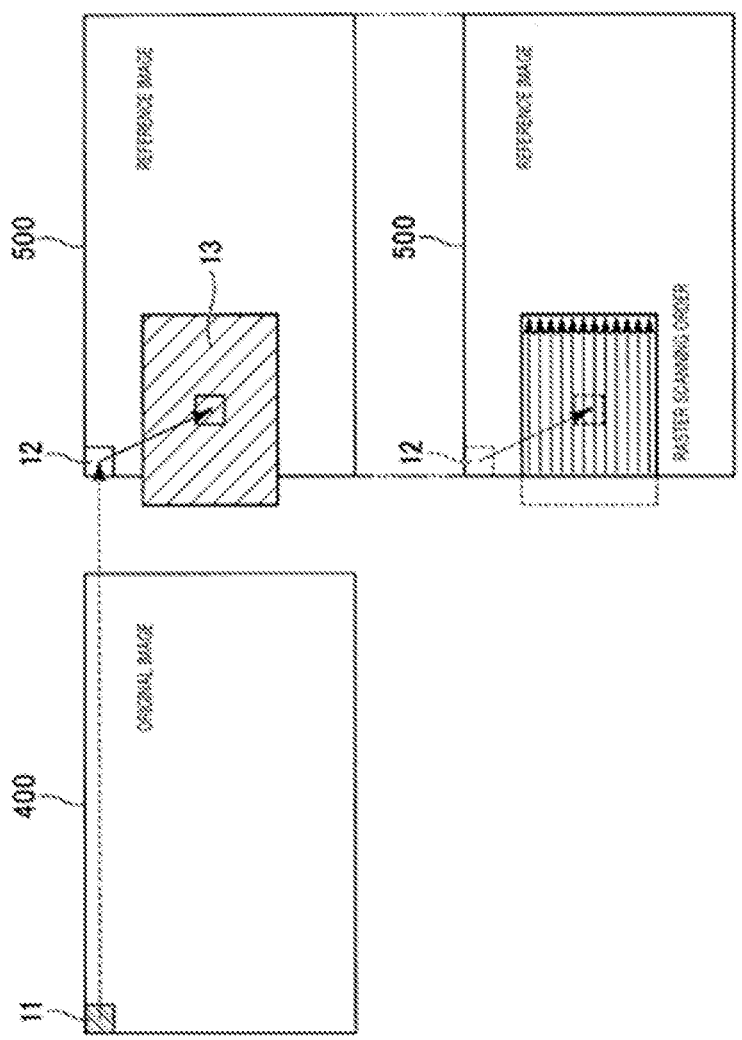
FIG. 8 is a view showing an example of initial transfer processing.

FIG. 8 is a view showing an example of the initial transfer processing. The buffer control unit 204 reads all of the reference image data of the search range 13 from the external memory 300 in raster scanning order. The data transfer amount during the initial transfer processing may reach a large data amount of a size of (Sx×Sy). The buffer control unit 204 executes the initial transfer processing before executing the encoding processing on the respective encoding blocks. In so doing, the buffer control unit 204 can secure a longer time than the time required to execute the encoding processing on one block as the initial transfer processing time. Thus, the buffer control unit 204 can suppress the transfer rate of the reference image data during the initial transfer processing to a low level.

As shown in FIG. 8, when the search range 13 protrudes from the reference image 500, the reference image data that are transferred to the reference image buffer 202 from the external memory 300 do not include the pixel values outside the reference image 500. Accordingly, the buffer control unit 204 generates the pixel values of the range protruding from the reference image 500 on the basis of the pixel values at the left edge or the right edge of the reference image 500.

The buffer control unit 204 reads the reference image data from the external memory 300 in raster scanning order and records the read reference image data in the reference image buffer 202. Hence, the buffer control unit 204 records the pixels on the upper side of the search range 13 in the reference image buffer 202 at earlier timings. Note that the buffer control unit 204 may read the reference image data from the external memory 300 in a raster scanning order in encoding block units rather than a raster scanning order in pixel units.

Returning to FIGS. 6 and 7, description of the operation of the encoding device 10 will be continued. The moving image encoding processing unit 100 starts the encoding processing in encoding block units. Immediately after the initial transfer processing, the moving image encoding processing unit 100 executes the encoding processing on the encoding target block 11 at the upper left edge of the original image 400 (step S103).

From step S104 to step S108, the buffer control unit 204 deletes unnecessary reference image data from the reference image buffer 202.

The buffer control unit 204 acquires a signal expressing the start of the encoding processing in encoding block units (referred to hereafter as "encoding block processing") from the moving image encoding processing unit 100. The buffer control unit 204 determines whether or not the encoding target block 11 is the encoding block at the start of the frame of the original image 400 (the encoding block at the upper left edge of the original image) (step S104).

When the encoding target block 11 is not the encoding block at the start of the frame of the original image 400 (step S104: NO), the buffer control unit 204 determines whether or not the encoding target block 11 is a block at the left edge of the frame of the original image 400 (step S105).

When the encoding target block 11 is not an encoding block at the left edge of the frame of the original image 400 (step S105: NO), the buffer control unit 204 deletes a part of the reference image data classified as "short term data" from the reference image buffer 202.

Here, the buffer control unit 204 successively deletes the reference image data on the left side of the search range so that the size of the "short term data" does not reach a size equaling or exceeding (search range width×search range height). More specifically, the buffer control unit 204 deletes the reference image data that have been stored in the reference image buffer 202 for a time equaling or exceeding (search range width/block width×processing time for 1 block), among the reference image data stored in the reference image buffer 202 as "short term data", from the reference image buffer 202 (step S106).

When the encoding target block is an encoding block at the left edge of the frame of the original image (step S105: YES), the buffer control unit 204 successively deletes the reference image data on the upper side of the search range so that the size of the "long term data" does not reach a size exceeding (search range width×search range height). More specifically, the buffer control unit 204 deletes the reference image data with a size of (search range width×block height) that were stored at the oldest timing, among the reference image data stored in the reference image buffer 202 as "long term data" (step S107).

The buffer control unit 204 deletes all of the reference image data stored in the reference image buffer 202 as "short term data" (step S108).

When the encoding target block 11 is the encoding block at the start of the frame of the original image 400, no unnecessary reference image data exist among the reference image data stored in the reference image buffer 202. In this case, the buffer control unit 204 reads reference image data from the external memory 300 in step S110 or step S111 and records the read reference image data in the reference image buffer 202 without deleting any reference image data from the reference image buffer 202.

When the encoding target block 11 is the encoding block at the start of the frame of the original image 400 (step S104: YES), the buffer control unit 204 determines whether the encoding target block 11 is a block at the right edge of the original image (step S109).

When the encoding target block 11 is not a block at the right edge of the original image 400 (step S109: NO), the reference image data other than the data located at the rightmost edge of the search range required by the next encoding target block overlap the reference image data in the search range of the current encoding target block and do not therefore need to be read. Hence, the buffer control unit 204 reads the reference image data at the rightmost edge of the search range required by the next encoding target block 11 from the external memory 300.

The size of the reference image data at the rightmost edge corresponds to a size of (block size width×search range height). The buffer control unit 204 classifies the read reference image data as "short term data". The buffer control unit 204 records the reference image data classified as "short term data" in the reference image buffer 202 (step S110).

Thus, the buffer control unit 204 reads the reference image data classified as "short term data" from the external memory 300 at a timing other than the timing for reading the reference image data classified as "long term data", among the timings of the respective encoding blocks.

When the encoding target block 11 is a block at the right edge of the original image 400 (step S109: YES), the reference image data other than the data located at the lowermost edge of the search range required by the next encoding target block 11 overlap the reference image data in the search range of the current encoding target block (the encoding block at the right edge of the line directly above) and do not therefore need to be read. Hence, the buffer control unit 204 reads the reference image data at the lowermost edge of the search range required by the next encoding target block 11 from the external memory 300. The size of the reference image data at the lowermost edge corresponds to a size of (search range width×block size height). The buffer control unit 204 classifies the read reference image data as "long term data". The buffer control unit 204 records the reference image data classified as "long term data" in the reference image buffer 202 (step S111).

Thus, the buffer control unit 204 reads the reference image data classified as "long term data" from the external memory 300 at a timing of once per (W/Bx) times (once per line). Accordingly, the reference image data of the search range 13 required by the encoding target block 11 at the left edge of the original image 400 are stored in the reference image buffer 202 over a long period, and therefore the buffer control unit 204 does not need to read the reference image data other than the data at the lowermost edge.

The buffer control unit 204 acquires a signal expressing the end of the encoding processing on the encoding target block 11 from the moving image encoding processing unit 100 (step S112). The buffer control unit 204 determines whether or not the encoding target block 11 on which the encoding processing has been completed is the encoding block at the terminal end of the frame of the original image 400 (step S113).

When the encoding target block 11 on which the encoding processing has been completed is an encoding block other than the encoding block at the terminal end of the frame of the original image 400 (step S113: NO), the buffer control unit 204 updates the encoding target block to the next encoding block (step S114) and returns the processing to step S103. When the encoding target block 11 on which the encoding processing has been completed is the encoding block at the terminal end of the frame of the original image 400 (step S113: YES), the buffer control unit 204 terminates the encoding processing on the encoding target frame of the original image 400 (step S115).

Next, transitions undergone by the long term data and short term data stored in the reference image buffer 202 will be described.

Figure 9:
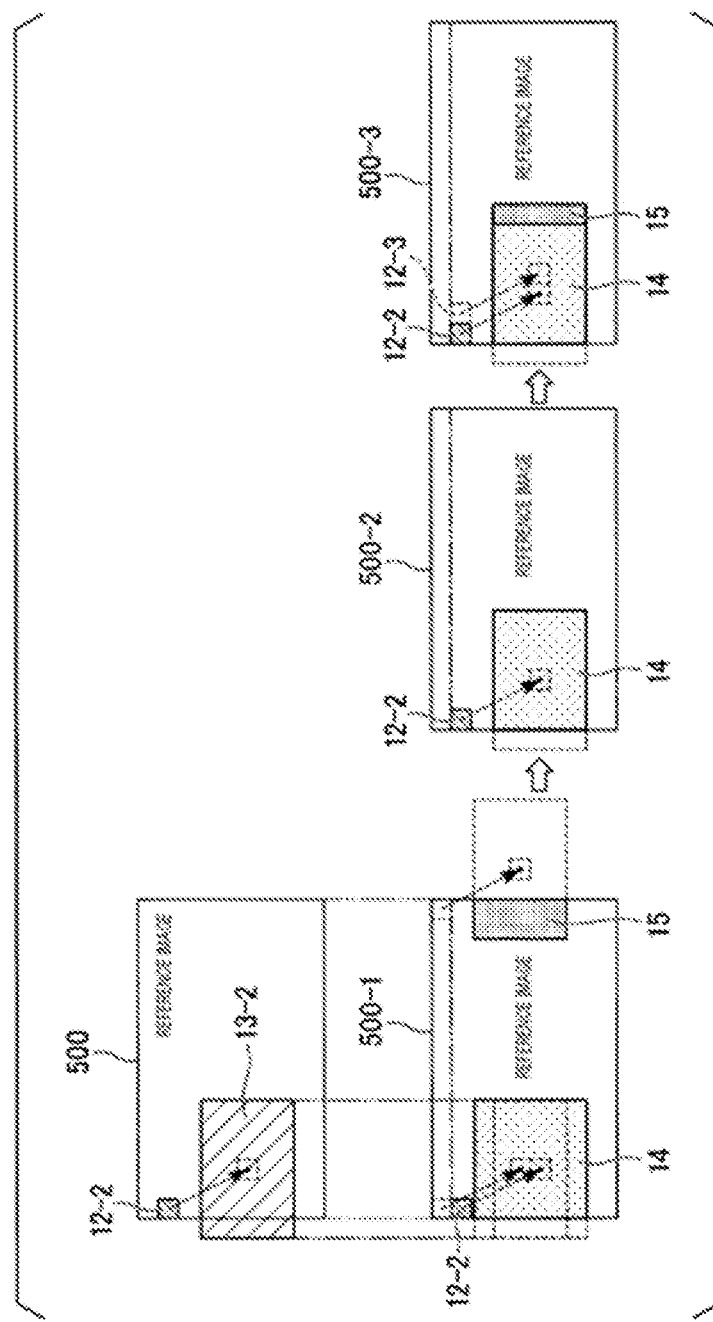

FIG. 9 is a view showing an example of the transitions undergone by the reference image data of the search range 13 required by an encoding target block 11 at the left edge of the original image 400 or the like. In FIG. 9, the search range required by the current encoding target block 11 at the left edge of the original image 400 is a search range 13-2 required by a current same-position block 12-2.

On a reference image 500-1, the reference image buffer 202 stores long term data 14 and short term data 15. The long term data 14 are data including the reference image data of the search range 13-2 required by the same-position block 12-2 and the reference image data included in an area corresponding to the height of one block on the upper side outside the search range 13-2. The short term data 15 are the reference image data of a search range required by a same-position block 12-1 on the line directly above the same-position block 12-2 at the right edge of the reference image 500-1.

As the next processing performed on the reference image 500-1, as indicated by a reference image 500-2, the buffer control unit 204 deletes the short term data 15 from the reference image buffer 202.

The buffer control unit 204 also deletes the reference image data included in the area corresponding to the height of one block on the upper side outside the search range 13-2 required by the same-position block 12-2 of the current encoding target block 11 from the reference image buffer 202. In other words, the buffer control unit 204 deletes the unnecessary reference image data, among the long term data 14, from the reference image buffer 202.

As the next processing performed on the reference image 500-2, as indicated by a reference image 500-3, the buffer control unit 204 reads the reference image data included in an area corresponding to the width of one block on the right side outside the search range 13-2 required by the same-position block 12-2 from the external memory 300 as the new required data of a search range required by a same-position block 12-3 of the next encoding target block 11. The buffer control unit 204 records the read reference image data in the reference image buffer 202 as the short term data 15.

Figure 10:
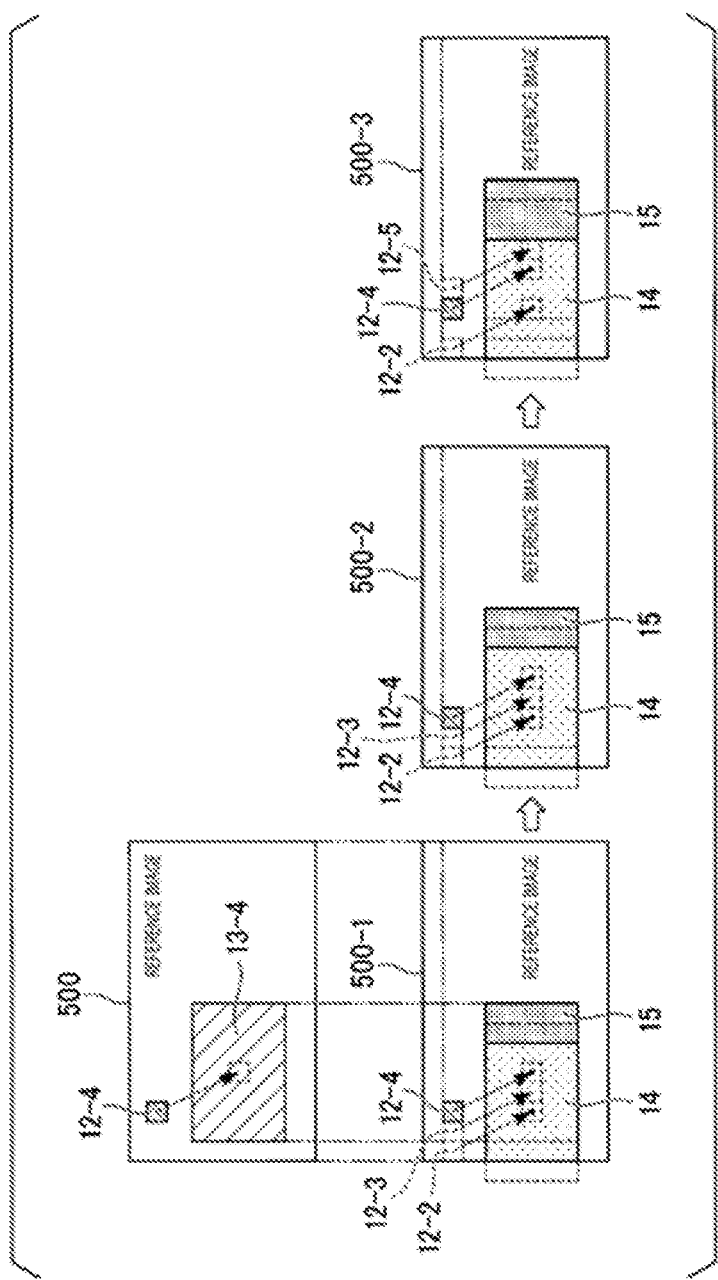

FIG. 10 is a view showing an example of the transitions undergone by the reference image data of the search range 13 required by an encoding target block 11 positioned near the left edge of the original image 400 or the like. In FIG. 10, the search range 13 required by the current encoding target block 11 positioned near the left edge of the original image 400 is a search range 13-4 required by a current same-position block 12-4.

On the reference image 500-1, the reference image buffer 202 stores the long term data 14 and the short term data 15. The long term data 14 are the reference image data classified as "long term data" among the reference image data of the search range 13-4 required by the same-position block 12-4 and the reference image data classified as "long term data" among the reference image data of a search range 13-3 required by the same-position block 12-3. The short term data 15 are the reference image data classified as "short term data" among the reference image data of the search range 13-4 required by the same-position block 12-4.

As the next processing performed on the reference image 500-1, as indicated by the reference image 500-2, since the short term data 15 are already stored in the reference image buffer 202 as a part of the reference image data of the search range 13-4 required by the same-position block 12-4, the buffer control unit 204 does not need to delete the short term data 15 from the reference image buffer 202.

As the next processing performed on the reference image 500-2, as indicated by the reference image 500-3, the buffer control unit 204 reads the reference image data included in an area corresponding to the width of one block on the right side outside the search range 13-4 required by the same-position block 12-4 from the external memory 300 as the new required data of a search range required by a same-position block 12-5 of the next encoding target block 11. The buffer control unit 204 records the read reference image data in the reference image buffer 202 as a part of the short term data 15.

Figure 11:
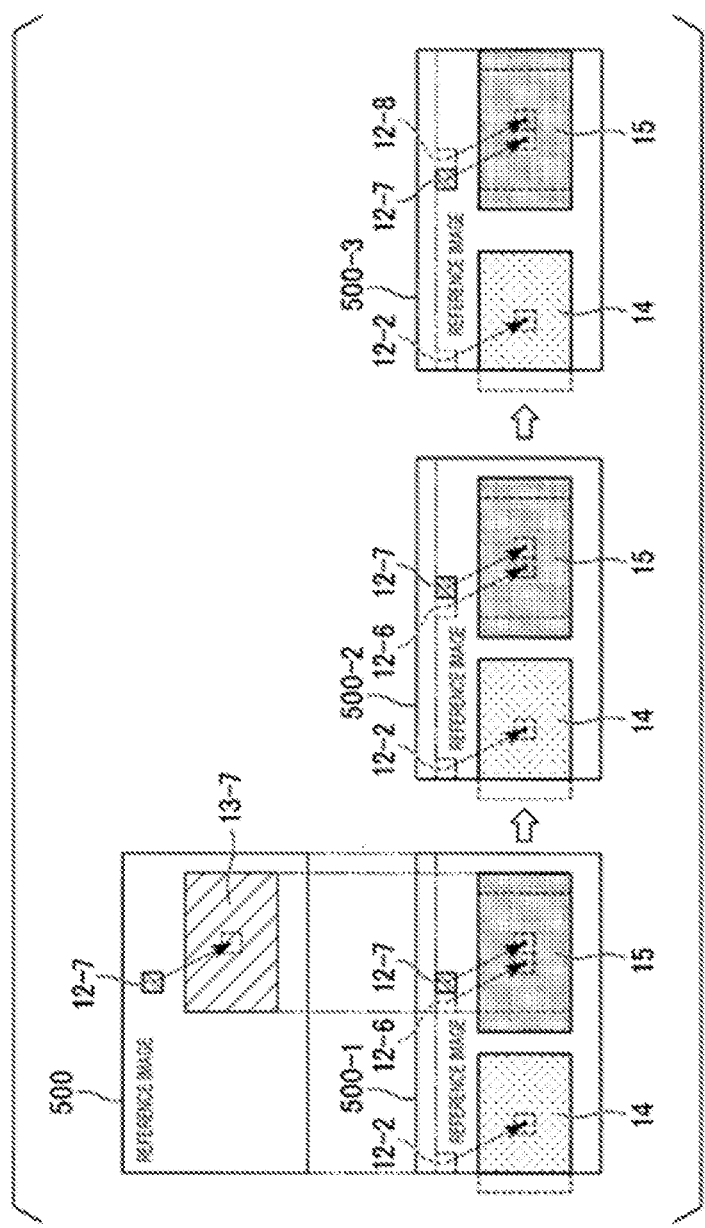

FIG. 11 is a view showing an example of the transitions undergone by the reference image data in the search range 13 required by an encoding target block 11 positioned near the right edge of the original image 400 or the like. In FIG. 11, the search range 13 required by the current encoding target block 11 positioned near the right edge of the original image 400 is a search range 13-7 required by a current same-position block 12-7.

On the reference image 500-1, the reference image buffer 202 stores the long term data 14 and the short term data 15. The long term data 14 are the reference image data classified as "long term data" among the reference image data of the search range 13-2 required by the same-position block 12-2. The short term data 15 are data including the reference image data of the search range 13-7 required by the same-position block 12-7 and the reference image data included in an area corresponding to the height of one block on the left side outside the search range 13-7.

As the next processing performed on the reference image 500-1, as indicated by the reference image 500-2, the buffer control unit 204 deletes the reference image data included in an area corresponding to the height of one block on the left side outside the search range 13-7 required by the same-position block 12-7 of the current encoding target block 11 from the reference image buffer 202. In other words, the buffer control unit 204 deletes the unnecessary reference image data, among the short term data 15, from the reference image buffer 202.

As the next processing performed on the reference image 500-2, as indicated by the reference image 500-3, the buffer control unit 204 reads the reference image data included in an area corresponding to the width of one block on the right side outside the search range 13-7 required by the same-position block 12-7 from the external memory 300 as the new required data of a search range required by a same-position block 12-8 of the next encoding target block 11. The buffer control unit 204 records the read reference image data in the reference image buffer 202 as a part of the short term data 15.

Figure 12:
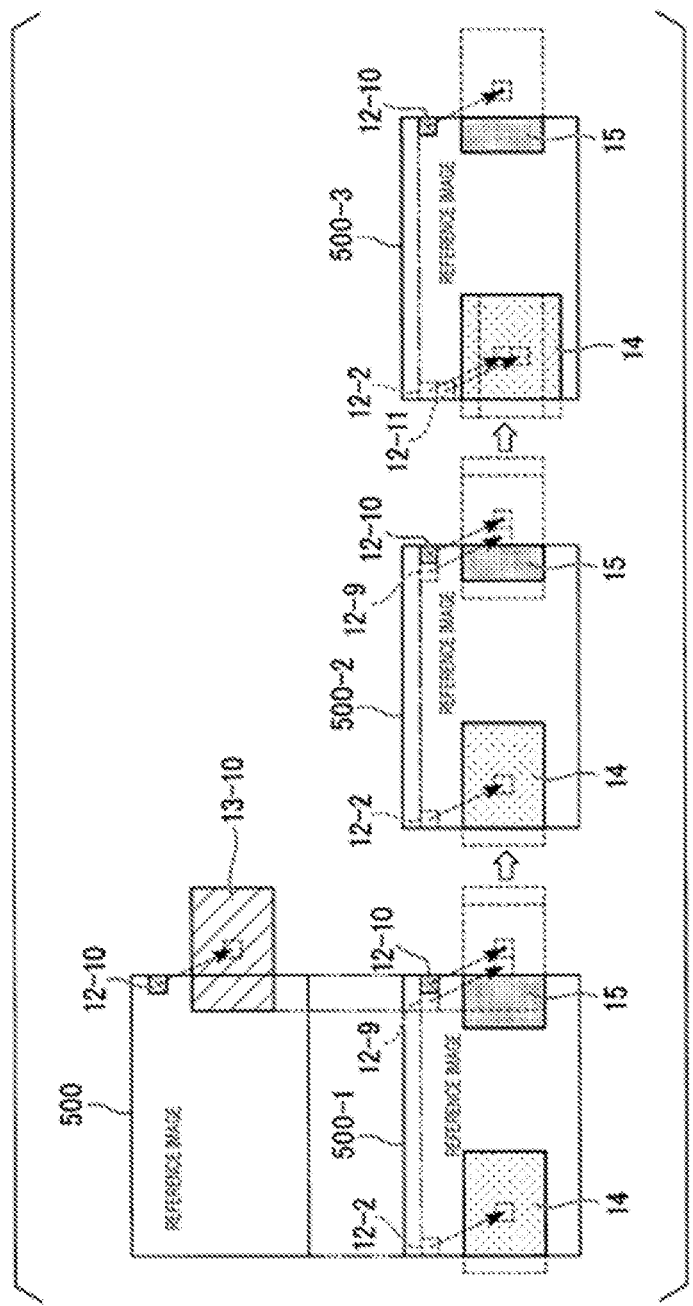

FIG. 12 is a view showing an example of the transitions undergone by the reference image data of the search range 13 required by an encoding target block 11 at the right edge of the original image 400 or the like. In FIG. 12, the search range required by the current encoding target block 11 at the right edge of the original image 400 is a search range 13-10 required by a current same-position block 12-10.

On the reference image 500-1, the reference image buffer 202 stores the long term data 14 and the short term data 15. The long term data 14 are the reference image data classified as "long term data" within the search range 13-2 required by the same-position block 12-2. The short term data 15 are the reference image data of a search range required by a same-position block 12-9 positioned near the right edge of the reference image 500-1.

As the next processing performed on the reference image 500-1, as indicated by the reference image 500-2, the buffer control unit 204 deletes the reference image data included in an area corresponding to the height of one block on the left side outside the search range 13-10 required by the same-position block 12-10 of the current encoding target block 11 from the reference image buffer 202. In other words, the buffer control unit 204 deletes the unnecessary reference image data, among the short term data 15, from the reference image buffer 202.

As the next processing performed on the reference image 500-2, as indicated by the reference image 500-3, the buffer control unit 204 reads the reference image data included in an area corresponding to the height of one block on the lower side outside the search range 13-2 required by the same-position block 12-2 from the external memory 300 as the new required data of a search range required by a same-position block 12-11 of the next encoding target block 11. The buffer control unit 204 records the read reference image data in the reference image buffer 202 as a part of the long term data 14.

The area hopping vector may also be oriented leftward.

Figure 13:
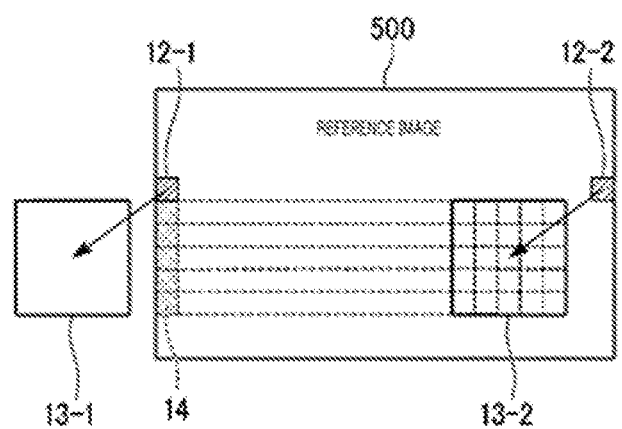
FIG. 13 is a view showing an example of a search range set using a leftward area hopping vector.

FIG. 13 is a view showing an example of a search range set using a leftward area hopping vector. In FIG. 13, the search range required by the current encoding target block, which is at the left edge of the original image, is the search range 13-2 required by the current same-position block 12-2. The long term data 14 are held in the memory 203 of the reference image buffer 202 while the encoding processing is executed on one line.

As described above, the moving image encoding buffer unit 200 according to this embodiment is a buffer device. The moving image encoding buffer unit 200 stores reference image data for each search range 13 of the reference image 500 (the reference frame) that is referred to during motion search processing executed in order of a first area, a second area, and a third area. The first area and the second area are encoding target blocks (partial areas) respectively located on an identical line of the encoding target frame. The third area is an encoding target block on the line below the identical line including the first and second areas. The moving image encoding buffer unit 200 includes the memory 203 and the buffer control unit 204. The memory 203 stores the reference image data. When the motion search processing is executed on the second area, the buffer control unit 204 executes control so that among the reference image data included in a first search range that is referred to during the motion search processing of the first area, the reference image data included in a third search range that is referred to during the motion search processing of the third area are left in the memory 203 without being deleted.

Thus, the buffer device according to this embodiment can suppress the buffer size of the reference image data and the data transfer rate of the external memory.

The buffer control unit 204 according to this embodiment executes control so that the reference image data included in the first and third search ranges, which include the left edge of the reference image 500, are left in the memory 203 without being deleted. When the motion search processing is executed on the third area, the buffer control unit 204 acquires the reference image data (the new required data) that were not left in the memory 203, among the reference image data of the third search range, and records the acquired reference image data in the memory 203. In other words, when the motion search processing is executed on the third area, the buffer control unit 204 records the reference image data not included in the first search range that is referred to during the motion search processing of the first area, among the reference image data included in the third search range that is referred to during the motion search processing of the third area, in the memory 203. When some of the pixels of the third search range protrude from the reference image 500, the buffer control unit 204 generates reference image data for the protruding pixels on the basis of the reference image data for the non-protruding pixels. The buffer control unit 204 records the generated reference image data and the acquired reference image data in the memory 203 as the new required data.

The buffer control unit 204 associates the labeling data representing the long period (the long term data), among the labeling data expressing whether or not the storage period in the memory 203 is the long period, with the acquired reference image data. The buffer control unit 204 executes control so that the reference image data with which the labeling data representing the long period are associated are left in the memory 203 for a longer period than the reference image data (the short term data) with which the labeling data representing the long period are not associated.

Thus, while the encoding processing is executed on one line, the buffer device according to this embodiment holds the reference image data relating to the left edge of the reference image in the memory 203 of the reference image buffer 202. As a result, the buffer device according to this embodiment can suppress the size of the reference image data held in the memory 203 of the reference image buffer 202 to a reference image data size within a range not exceeding twice (1.5 times, for example) the size of the search range, and can thereby suppress the data transfer rate required of the external memory 300 to either (encoding block width×search range height/processing time for 1 block) or (search range width×encoding block height/processing time for 1 block).

The buffer device according to this embodiment is capable of keeping the size of the search range substantially constant, and thereby keeping the transfer rate of the reference image data substantially constant, even after the encoding processing line is updated. The buffer device according to this embodiment is also compatible with area hopping, and can therefore suppress the scale and power of the encoding device 10 at a low transfer rate while maintaining the coding efficiency.

An embodiment of the present invention was described in detail above with reference to the figures, but the specific configurations are not limited to this embodiment, and designs and the like within a scope that does not depart from the spirit of the invention are also included therein.

The encoding device of the embodiment described above may be realized by a computer. In this case, a program for realizing the functions thereof may be recorded on a computer-readable recording medium, and the program recorded on the recording medium may be read to and executed by a computer system. Note that here, the "computer system" is assumed to include an OS and hardware such as peripheral devices. Further, the "computer-readable recording medium" refers to a portable medium such as a flexible disk, a magneto-optical disk, a ROM, or a CD-ROM, or a storage device such as a hard disk built into the computer system. The "computer-readable recording medium" may also include a component that holds the program dynamically for a short period of time, such as a communication line in a case where the program is transmitted over a network such as the Internet or a communication network such as a telephone network, or a component that holds the program for a fixed amount of time, such as a volatile memory provided in a computer system that serves as a server or a client in this case. Furthermore, the program may be a program used to realize some of the functions described above, a program that can realize the functions described above in combination with a program already recorded in the computer system, or a program realized using a programmable logic device such as an FPGA (Field Programmable Gate Array).

INDUSTRIAL APPLICABILITY

The present invention can be applied to a device for encoding moving images.

REFERENCE SIGNS LIST

10 Encoding device
11 Encoding target block
12 Same-position block
13 Search range
14 Long term data
15 Short term data
16 New required range
100 Moving image encoding processing unit
101 Original image shaping unit
102 Intra prediction processing unit
103 Inter prediction processing unit
104 Predicted remaining difference signal generation unit
105 Transform/quantization processing unit
106 Entropy encoding unit
107 Inverse quantization/inverse transform processing unit
108 Decoded signal generation unit
109 Loop filter processing unit
200 Moving image encoding buffer unit
201 Original image buffer
202 Reference image buffer
203 Memory
204 Buffer control unit
300 External memory
400 Original image
500 Reference image
501 Block
502 Block
503 Block
504 Block
505 Block
601 Search range
602 Search range
603 Search range
604 Search range

The invention claimed is:

1. A buffer device comprising:
a memory for storing reference image data for each search range of a reference frame that is referred to during motion search processing executed in the order of a first area, a second area, and a third area, wherein the first area and the second area are partial areas respectively located on an identical line of an encoding target frame, and the third area is a partial area on the line below the identical line; and
a buffer control unit executes control, when the motion search processing is executed on the second area, so that among the reference image data included in a first search range that is referred to during the motion search processing of the first area, the reference image data included in a third search range that is referred to during the motion search processing of the third area are left in the memory without being deleted.

2. The buffer device according to claim 1, wherein the buffer control unit executes control so that the reference image data included in the first search range and the third search range, which include a left edge of the reference frame, are left in the memory without being deleted.

3. A buffer device comprising:
a memory for storing reference image data for each search range of a reference frame that is referred to during motion search processing executed in the order of a first area, a second area, and a third area, wherein the first area and the second area are partial areas respectively located on an identical line of an encoding target frame, and the third area is a partial area on the line below the identical line; and
a buffer control unit executes control, when the motion search processing is executed on the third area, records the reference image data not included in a first search range that is referred to during the motion search processing of the first area, among the reference image data included in a third search range that is referred to during the motion search processing of the third area, in the memory.

4. The buffer device according to claim 3, wherein, when some pixels of the third search range protrude from the reference frame, the buffer control unit generates the reference image data of the protruding pixels on the basis of the reference image data of the non-protruding pixels, and records the generated reference image data together with the acquired reference image data in the memory.

5. The buffer device according to claim 1, wherein the buffer control unit associates labeling data representing a long period, among labeling data expressing whether or not a storage period in the memory is the long period, with the acquired reference image data, and executes control so that the reference image data with which the labeling data representing the long period are associated are left in the memory for a longer period than the reference image data with which the labeling data representing the long period are not associated.

* * * * *